Sept. 15, 1970 W. HAUER 3,529,088

MULTIPLEX VOICE AND DATA TRANSMISSION SYSTEM

Filed May 2, 1967

2 Sheets-Sheet 1

INVENTOR.
WERNER HAUER
BY Popper, Bain & Bobis
ATTORNEYS

INVENTOR.
WERNER HAUER
BY Popper Bain & Bobis
ATTORNEYS

United States Patent Office 3,529,088
Patented Sept. 15, 1970

3,529,088
MULTIPLEX VOICE AND DATA TRANSMISSION SYSTEM

Werner Hauer, R.D. 2, Box 219, Sayre, Pa. 18840

Filed May 2, 1967, Ser. No. 635,572
Int. Cl. H04j 3/00
U.S. Cl. 179—15 8 Claims

ABSTRACT OF THE DISCLOSURE

My invention relates to intelligence transmission generally and specifically to a duplex voice and data transmission system wherein a single transmission channel may be employed to transmit simultaneously both substantially live-time, continuous intelligence such as voice as well as discontinuous live-time intelligence which may be a data, a video or a second, chopped voice channel.

FIELD OF INVENTION

The field of my invention relates to intelligence transmission through telephone lines, cables or other suitable means generally and more specifically to the transmission of both continuous and substantially live-time voice intelligance and discontinuous but substantially live-time data intelligence through the same transmission means. At present, when a particular transmission channel is employed for the transmission of both voice and data, the channel must be used exclusively for but one at a time while the other intelligence remains silent. My invention contemplates the simultaneous transmission of both voice and data intelligence over the same transmission channel whereby the voice intelligence may be received in a smooth, uninterrupted fashion substantially as generated with but negligible distortion. At the same time, the data intelligence is received in a substantially live but discontinuous fashion. In order to accomplish this principal object of my invention, the voice intelligence is generated, divided into timed sequences, interspersed with timed sequences of the data intelligence, transmitted as a mixed signal over the same transmission channel and the voice intelligence played back in an uninterrupted continuous fashion by selective and timed playback means.

SUMMARY OF INVENTION

By way of summary, my invention is a multiplex voice and data transmission system comprising separate voice and data intelligence signal generators, synchronized first and second means for separating each of the data and voice intelligence signals into discrete segments and interspersing the segments to generate a mixed signal of voice and data, means for transmitting the mixed signal to a remote location, memory means connected to the output of the transmission means for reception and storage of the mixed signal, playback means for selectively acquiring only the voice signal segments in timed relationship to generate a continuous, uninterrupted voice signal, and receiver means for the said voice signal. More particularly, the memory means comprises means for receiving and storing simultaneously, at least one band of time dispersed voice signal and at least one playback means for alternately playing back, the time dispersed voice signal interspersing segments thereof with other time related segments to generate a continuous, uninterrupted voice signal in substantially live time to the generated voice signal.

PREFERRED EMBODIMENT OF INVENTION

My multiplex voice and data transmission system is illustrated in the drawings in which.

Figure 1:
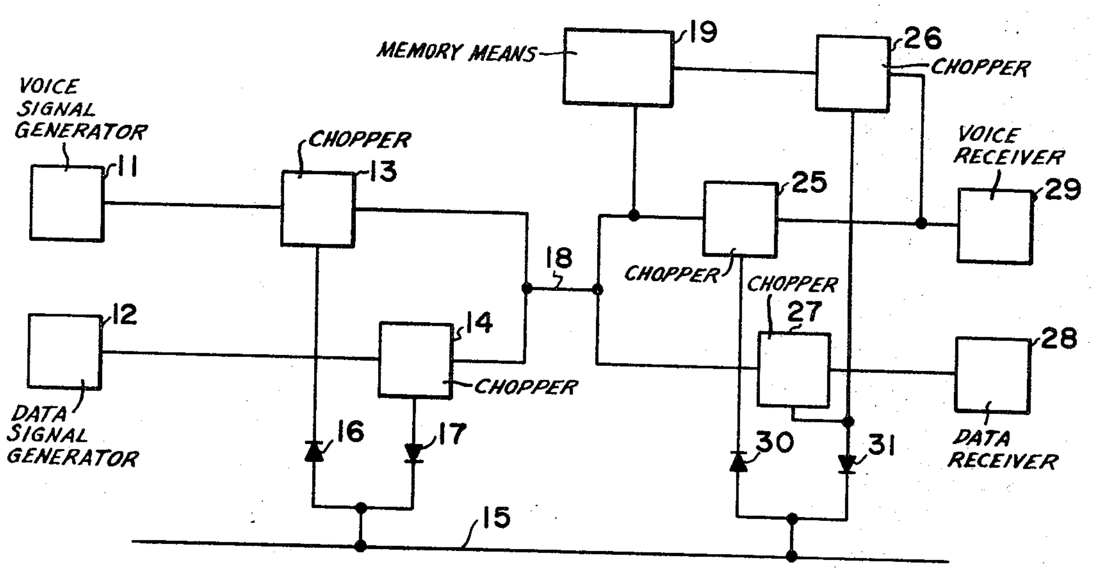
FIG. 1 is a schematic diagram of my system.
Figure 3:
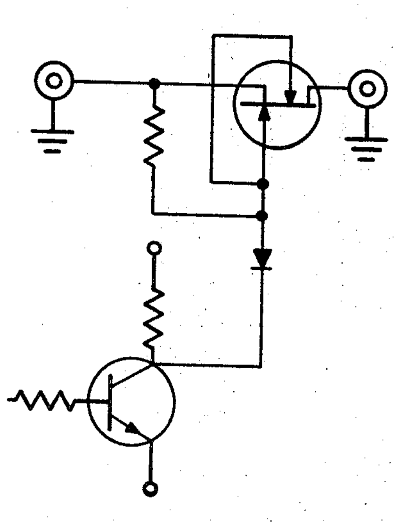
FIG. 3 is a schematic wiring diagram of a typical, solid state chopper circuit which may be employed in my system.

Referring now to the drawings in detail and specifically to FIG. 1, my multiplex data and voice transmission system comprises a voice intelligence signal generator 11 and a data intelligence signal generator 12. Both the voice signal generator 11 and the data signal generator 12 are of well known design and construction and need be detailed no further. I contemplate dividing both the voice intelligence signal and the data intelligence signal into discrete time-related segments and thereafter alternately mixing the segments to create a mixed voice and data intelligence signal which may be conveniently transmitted over the same transmission channel. In order to accomplish this end, the output of the voice intelligence signal generator 11 is connected to a chopper 13. Similarly, the output of the data intelligence signal generator 12 is connected to a second chopper 14. The choppers 13 and 14 may be of any well known variety and one solid state chopper circuit is illustrated in FIG. 3.

In order to synchronize the choppers 13 and 14, each is driven by a common source of synchronous signal 15. The diodes 16 and 17 bias the choppers respectively 13 and 14 with the synchronous signal 15 and incidentally isolate the said choppers from undesired feedback signals.

Figure 4:
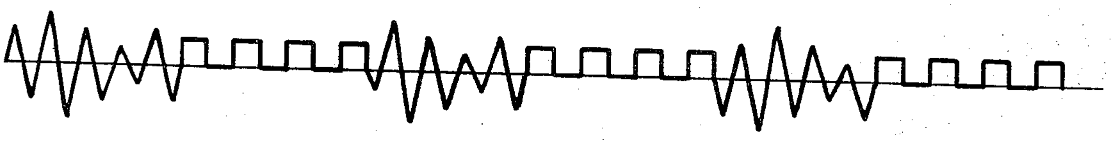
FIG. 4 is a schematic illustration of the mixed signal transmitted through my system.

The choppers 13 and 14 divide each of the said voice and data signals into discrete segments and thereafter combine them into a mixed signal of alternately voice intelligence and data intelligence which signal is schematically illustrated in FIG. 4.

The mixed signal is transmitted through some suitable transmitting means 18 as for instance, a telephone line, a coaxial cable or the like. The mixed signal transmitted by the transmission means 18 may be fed into one of two basic receiver and playback systems respectively illustrated in FIGS. 2 and 5 of the drawings.

Figure 2:
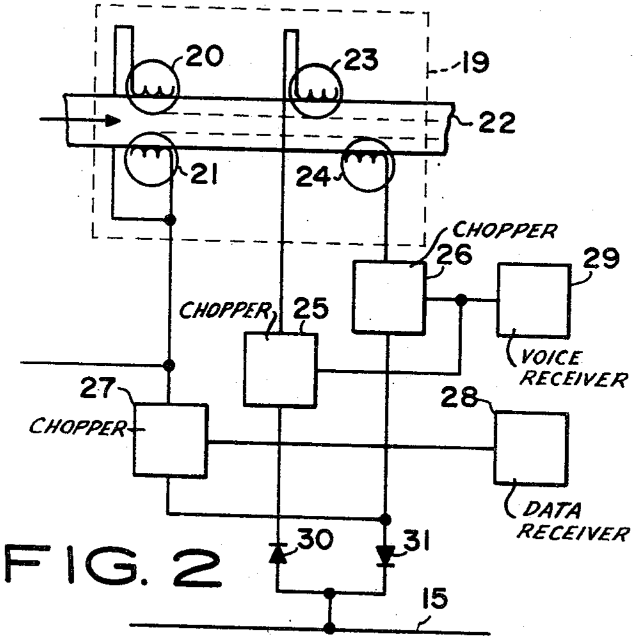
FIG. 2 is a breadboard schematic diagram of the voice and data receiver and playback portion of my system.

Referring specifically to the receiver and playback system illustrated in FIG. 2, the mixed signal is fed into memory means 19. The memory means 19 comprise a continuous, movable, magnetic tape 22 driven past a pair of magnetic recording heads respectively 20 and 21. The recording heads 20 and 21 simultaneously record two tracks of the mixed signal comprising both voice and data intelligence. It should, however, be noted, that the data intelligence may be filtered out from the mixed signal before input into the memory means 19 so that the recording heads 20 and 21 record only the voice intelligence segments of the mixed signal.

The magnetic tape 22 moves from left to right in FIG. 2 passing over a pair of time-spaced magnetic playback heads respectively 23 and 24. The playback heads 23 and 24 respectively track one each of the two tracks of voice intelligence on the magnetic tape 22. However, magnetic playback head 23 is spaced in the direction of movement of the tape 22 a distance from the other playback head 23 a distance equal to the width of the data segment of the mixed signal transmitted through means 18 and either recorded or blanked out on each of the two tracks on tape 22.

The output signal of the playback heads 23 and 24 is respectively fed into choppers 25 and 26. In order to maintain synchronization between choppers 25 and 26 and as among the pair of choppers 13–14 and 25–26, choppers 25 and 26 are driven by a common source of synchronous power 15.

The outputs of choppers 25 and 26 are fed into a voice intelligence receiver 29 which may of course, be a telephone.

The playback heads 23 and 24 transmit voice signals alternately as controlled by choppers 25 and 26 in synchronous relationship to the voice signal generated through the output of chopper 13, each playback head playing back the voice signal but from one of the two tracks of voice signal on the magnetic tape 22. Thus, as the playback head 23 terminates at the end of one segment of voice intelligence on one track the playback head 24 picks up the same sequence of voice intelligence from the other track. The combined signal derived from individual signal segments from different tracks produces an uninterrupted continuous voice signal. This continuous uninterrupted voice signal is fed into a receiver 29 which may be a telephone.

Simultaneously, the mixed signal from transmission means 18 is fed into chopper 27. Chopper 27 is synchronized with choppers 25 and 26 to transmit in a discontinuous fashion, individual segments of data intelligence derived from the mixed signal transmitted into means 18. The output of chopper 27 is fed into some appropriate data receiver 28. Synchronization of choppers 13–14, 25–26 and 27 is maintained by driving each with the same synchronous power source 15. Chopper 25 and choppers 26 and 27 are isolated from the synchronous power source by diodes 30 and 31.

In FIG. 3, a typical solid state chopper wiring diagram is schematically illustrated. The monitor frequency is lower than the lowest transmission frequency and is preferably a subharmonic of the power line frequency which, thus, produces the simpliest type of synchronization among the choppers.

The time delay between actual voice signal generation and voice signal reception is no greater than the time required for the magnetic tape 22 to traverse between recorder heads 20 and 21 and playback heads 23 and 24. Thus, a substantially live voice signal transmission is produced.

Figure 5:
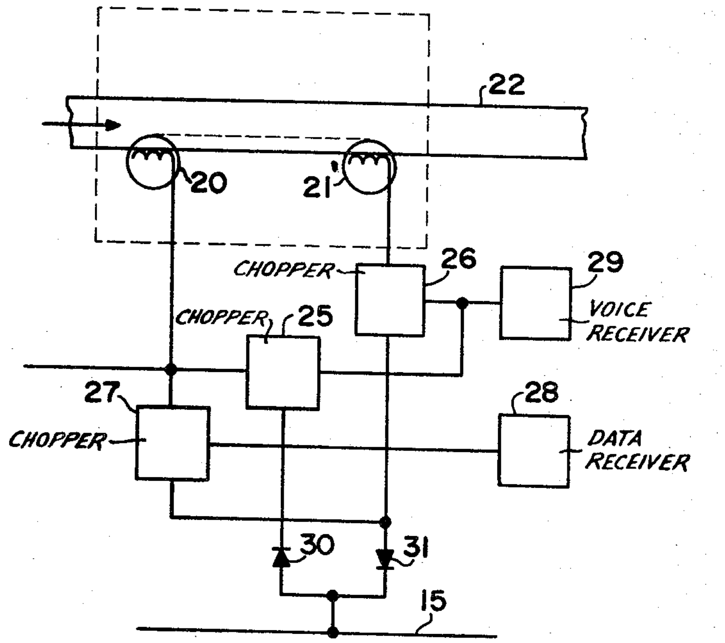
FIG. 5 is a breadboard schematic diagram of an alternative voice and data receiver and playback portion for my system.

FIG. 5 illustrates another breadboard wiring diagram for an alternate receiver and playback system. For convenience, the same numerals are employed where they refer to the same element. The mixed signal outputs from transmission means 18 is fed into a magnetic recording head 20 which records a single track of mixed signal on the recording tape 22. Simultaneously, the mixed signal from transmission means 18 is fed into chopper 25. The output of chopper 25 is fed into voice receiving means 29.

A magnetic playback head 21′ is positioned to playback the track of recorded mix signal on the tape 22. However, the output from magnetic playback head 21′ is fed through a second chopper 26, the output of chopper 26 being fed into voice receiver means 29.

The mixed signal of voice and data is also fed simultaneously into a third chopper 27, the output of which is fed into data receiving means 28.

In order to produce a continuous, substantially live-time voice transmission, choppers 25 and 26 function in alternate timed relationship to each other. In this manner, chopper 25 will permit a segment of the voice transmission in the mixed signal to pass therethrough to the voice receiving means 29 while the chopper 26 simultaneously cuts off magnetic playback head 21′. When the given segment of voice transmission is terminated, chopper 25 isolates the mixed signal coming from the transmission means 18 and chopper 26 is energized to transmit the next succeeding segment of voice signal previously recorded on tape 22 to be fed into receiving means 29. Thus, a continuous, uninterrupted, substantially live-time voice transmission is produced.

Chopper 27 functions in timed relationship to choppers 25 and 26 such that it will output only the data segments to the data receiving means 28, chopper 27 isolating data receiving means 28 from the voice intelligence portions of the mixed signal.

As in the case of the system illustrated in FIG. 2, choppers 25 and 26 are biased by a source of synchronous power 15 through diodes 30 and 31. Diode 31 also biases chopper 27.

It also may be noticed, that the synchronization of the receiving side may be controlled by a signal incorporated in the data-train of the mixed signal.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention, although they are not specifically catalogued herein.

I claim:

1. A multiplex voice and data intelligence transmission system comprising:
  (a) voice intelligence and data intelligence signal generators,
  (b) means for separating the voice and data signals into discrete, separate segments and combining the segments alternately to produce a continuous mixed signal of alternate voice and data intelligence,
  (c) means for transmitting the mixed signals,
  (d) memory means for reception and storage of the transmitted mixed signal,
  (e) playback means for acquiring at least the voice segments of the mixed signals and transmitting only voice segments of the stored mixed signal alternately in timed relationship with both preceding and succeeding segments of the voice signal to produce a continuous, uninterrupted sequence of voice signal segments timed synchronously as generated to simulate a substantially undistorted and live-time voice transmission,
  (f) receiving means for said uninterrupted sequence, and
  (g) means for simultaneous but discontinuous reception of individual segments of the data signal in the mixed signal.

2. A multiplex voice and data transmission system comprising,
  (a) the structure in accordance with claim 1 in which,
  (b) the memory means consists of means for receiving and storing simultaneously and in identical time-phased relationship at least two bands of a sequence of separated voice signal segments derived from the transmitted mixed signal,
  (c) the playback means consists of a separate playback means for each of said bands out of time phase with respect to each other a time equivalent to the time of the data segments separating the voice segments and means for transmitting from said separate playback means alternately to produce an uninterrupted, continuous sequence of voice signals alternately derived from different bands.

3. A multiplex voice and data transmission system comprising,
  (a) the structure in accordance with claim 2 in which,
  (b) the means for separating the voice and data signals as generated and the means for alternately transmitting from the separate playback means and for simultaneously but discontinous reception of the data segments of the mixed signal are synchronized choppers.

4. A multiplex voice and data intelligence transmission system comprising,
  (a) the structure in accordance with claim 2 in which,
  (b) the memory means are transportable magnetic tape coupled with magnetic recording heads connected for reception and recording of the voice segments of the mixed signal, and (c) the separate playback means are magnetic playback heads.

5. A multiplex voice and data intelligence transmission system comprising, (a) the structure in accordance with claim 3 in which, (b) the memory and receiving means are a transportable magnetic tape coupled with magnetic recording heads connected for reception of the voice segments of the mixed signal, and (c) the separate playback means are magnetic playback heads.

6. A multiplex voice and data transmission system comprising, (a) the structure in accordance with claim 1 in which, (b) the memory means consists of means for receiving and storing a single band of a sequence of separated voice signal segments, and (c) the playback means consists of playback means for acquiring and transmitting voice segments stored on the said single band alternately and in timed relationship with both preceding and succeeding alternate voice segments in the mixed signal to produce a continuous, uninterrupted sequence of voice signal segments timed synchronously as generated to simulate a substantially undistorted and live-time voice transmission.

7. A multiplex voice and data transmission system comprising, (a) the structure in accordance with claim 6, in which, (b) the memory means are a transportable magnetic tape coupled with a magnetic recording head connected for reception and recording of at least voice segments of the mixed signal, and (c) the playback means are a magnetic playback head aligned for playing back of voice segments recorded on the magnetic tape.

8. A multiplex voice and data transmission system comprising, (a) the structure in accordance with claim 6, in which, (b) the means for separating the voice and data signals as generated, the means for acquiring and transmitting alternate stored voice segments and interspersing said segments alternately with both preceding and succeeding alternate voice segments in the mixed signal, and the means for discontinuous reception of the data segments of the mixed signal are synchronized choppers.

References Cited

UNITED STATES PATENTS

| | | |
|---|---|---|
| 2,881,251 | 4/1959 | Strip. |
| 3,157,739 | 11/1964 | Okamura. |
| 3,226,480 | 12/1965 | Wright et al. |
| 3,268,665 | 8/1966 | Miller et al. |
| 3,423,850 | 1/1969 | Snepvangers. |

RALPH D. BLAKESLEE, Primary Examiner

U.S. Cl. X.R.

179—2, 100.2